United States Patent [19]

Imamura

[11] Patent Number: 5,719,639
[45] Date of Patent: Feb. 17, 1998

[54] METHOD AND APPARATUS FOR CHANGING SPECIFIED COLOR IN A COLOR IMAGE

[75] Inventor: Atsushi Imamura, Kyoto, Japan

[73] Assignee: Dainippon Screen Mfg., Ltd., Japan

[21] Appl. No.: 619,887

[22] Filed: Mar. 20, 1996

[30] Foreign Application Priority Data

Mar. 29, 1995 [JP] Japan ................. 7-097830

[51] Int. Cl.$^6$ ................. H04N 9/74; H04N 9/64
[52] U.S. Cl. ................. 348/577; 348/645; 348/650; 348/661; 345/150
[58] Field of Search ................. 348/577, 645, 348/649, 650, 652, 661, 671, 576; 345/150, 152; 358/537, 531; H04N 9/64, 9/68, 9/74

[56] References Cited

U.S. PATENT DOCUMENTS

| 4,710,800 | 12/1987 | Fearing et al. | 348/557 |
|---|---|---|---|
| 4,862,251 | 8/1989 | Belmares-Sarabia et al. | 348/577 |
| 4,953,008 | 8/1990 | Kaye | 348/577 |
| 5,487,020 | 1/1996 | Long | 364/571.01 |
| 5,521,615 | 5/1996 | Boyan | 345/150 |

FOREIGN PATENT DOCUMENTS

| 441558 | 8/1991 | European Pat. Off. . | |
|---|---|---|---|
| 693738 | 6/1995 | European Pat. Off. . | |
| 2681967 | 4/1993 | France . | |
| 540833 | 2/1993 | Japan | G06F 15/72 |

Primary Examiner—Glenton B. Burgess
Attorney, Agent, or Firm—Ostrolenk, Faber, Gerb & Soffen, LLP

[57] ABSTRACT

A subject color and a non-subject color of color change operation are specified and then a first color vector representing the subject color and a second color vector representing the non-subject color are obtained. A substitute color for replacing a component of the subject color is further specified, and a color vector representing the substitute color is obtained. A third color vector independent of the first and second color vectors is further determined. A color of each pixel in an original color image is expressed by linear combination of the first through third color vectors, thereby obtaining first through third coefficients for the first through the third color vectors. If the first coefficient is positive, the first color vector is replaced by the substitute color vector. The pixel color after the color change operation is then determined by producing a composite vector using the first through the third coefficients.

16 Claims, 16 Drawing Sheets

THREE COLOR VECTORS IN RGB SPACE

HSV SPACE

DETERMINATION OF THIRD COLOR VECTOR V3

FIG. 11(A) BEFORE COLOR CHANGE OPERATION
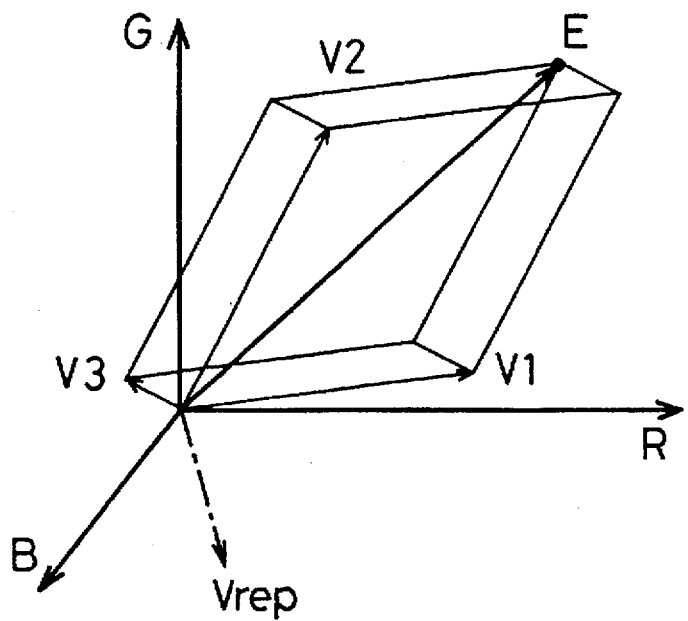
FIG. 11(B) AFTER COLOR CHANGE OPERATION
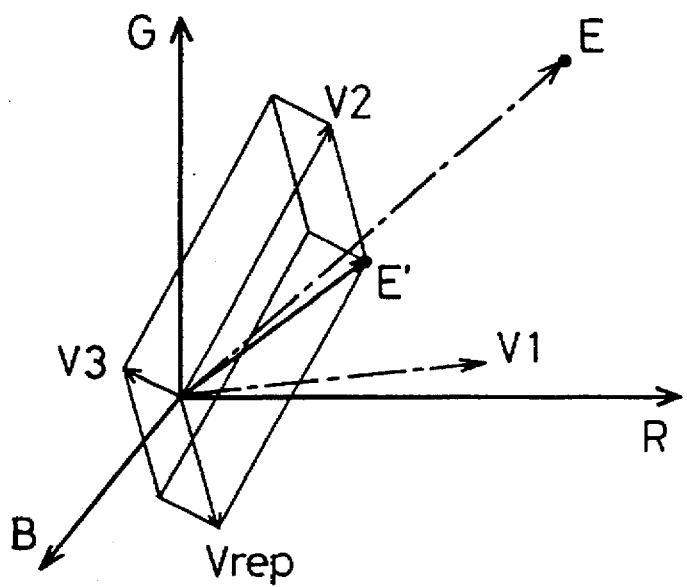

FIG. 17(A) ORIGINAL COLOR IMAGE
SUBJECT COLOR AREA
FIG. 17(B) BRUSH MASK
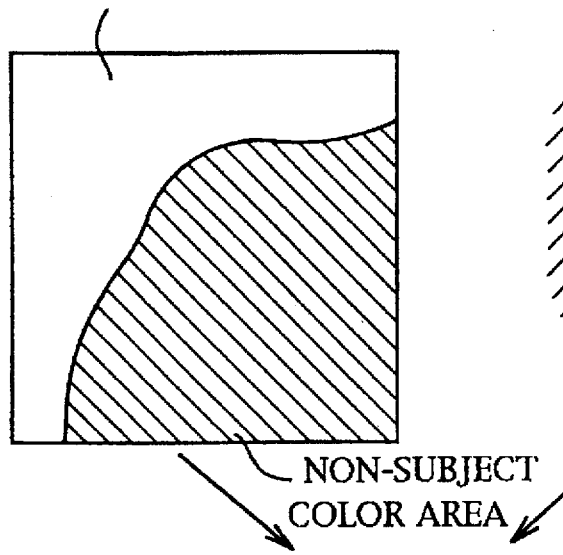
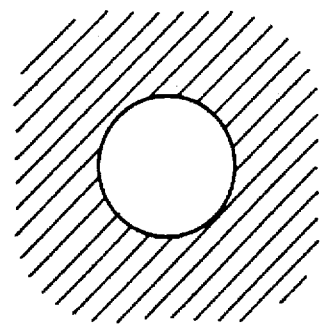
NON-SUBJECT COLOR AREA
FIG. 17(C) COLOR CHANGE OPERATION
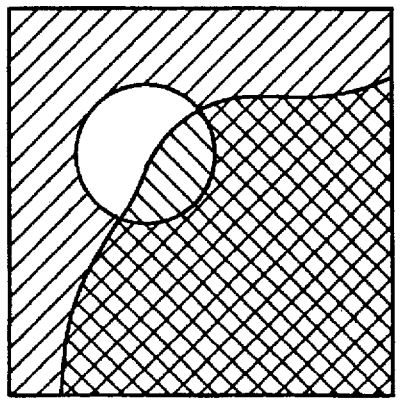
FIG. 17(D) AFTER COLOR CHANGE OPERATION
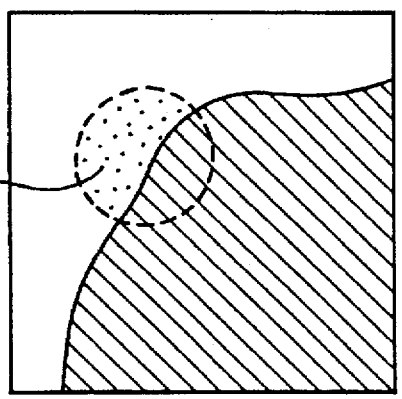
COLOR-CHANGED AREA

METHOD AND APPARATUS FOR CHANGING SPECIFIED COLOR IN A COLOR IMAGE

BACKGROUND OF THE INVENTION

1. Field of the Invention

The present invention relates to a method of and an apparatus for selectively changing a specified color of an image part included in a color image into another desired color.

2. Description of the Related Art

In the field of image processing, there is a demand for selectively changing a specified color of an image part included in an original color image, such as a color photograph, into another desired color. In some cases, the user wants to change, for example, only a specified color of clothes of a model or a specific color of fruit. In order to selectively change only a specified color of an image part included in a color image into another desired color, a conventional method prepares a cutout mask representing the specified color part and changes the color of each pixel within the area of the cutout mask.

The process of preparing a cutout mask requires a substantial time and labor. The conventional method accordingly requires much time and labor in preparing a cutout mask prior to the actual color change process.

SUMMARY OF THE INVENTION

An object of the present invention is thus to provide a method of and an apparatus for executing an actual color change process without preparing any cutout masks.

The present invention is directed to a method of changing a color in a color image into another color. The method comprises the steps of: (a) specifying first and second colors for defining a color range to be processed by color change operation; (b) specifying a substitute color, which is to be used as a color component of a changed color after the color change operation; (c) obtaining first and second color vectors representing the first and second colors in a color space; (d) obtaining a substitute color vector representing the substitute color in the color space; (e) obtaining a third color vector linearly independent of the first and second color vectors; (f) expressing a color of each pixel in the color image by a linear combination of the first through third color vectors, to thereby obtain first through third coefficients for the first through third color vectors; and (g) if the first coefficient for a current pixel is positive, executing the color change operation through combing the substitute color vector, the second color vector, and the third color vector while using the first through third coefficients as weighting factors, respectively, to thereby produce a changed-color vector representing a changed color of the current pixel.

Accordingly, the color change operation can be readily executed without preparing any masks.

In a preferred embodiment, the step (g) comprises the step of executing the color change operation only if the first and second coefficients are both positive for the current pixel.

This allows to select a target color of color change operation so that the target color includes both components of the first and second colors.

The third color vector represents white in the preferred embodiment.

The step (e) comprises the steps of: transforming the first and second color vectors to fourth and fifth color vectors in a hue/saturation/brightness space; and selecting a vector representing white in the color space as the third color vector when saturation components of the fourth and fifth color vectors are more than a predetermined value; and when a saturation component of at least one of the fourth and fifth color vectors is less than the predetermined value, rotating a hue component of one the fourth and fifth color vectors, whose saturation component is the greater, by a predetermined angle in the hue/saturation/brightness space to generate a sixth color vector and transforming the sixth color vector into the color space to generate the third color vector.

Thus the target color of color change operation is selected depending upon the hue of each pixel, and the hue component of the target color can be changed accordingly.

According to another aspect of the present invention, the method comprises the steps of: (a) specifying a subject color and a pair of adjoining non-subject colors for defining a color range to be processed by color change operation; (b) specifying a substitute color, which is to be used as a color component of a changed color after the color change operation; (c) obtaining a first color vector representing the first color in a color space, and a pair of second color vectors representing the pair of adjoining non-subject colors; (d) obtaining a substitute color vector representing the substitute color in the color space; (e) successively selecting one of the pair of second color vectors, and obtaining a third color vector linearly independent of the first color vector and the selected second color vector, to thereby obtain a pair of vector combinations each including the first vector, the selected second vector, and the third vector; (f) selecting one of the pair of vector combinations, and expressing a color of each pixel in the color image by a linear combination of three color vectors included in the selected vector combination, to thereby obtain first through third coefficients for the three color vectors; and (g) executing the color change operation through combing the substitute color vector, the selected second color vector included in the selected vector combination, and the third color vector while using the first through third coefficients as weighting factors, respectively, to thereby produce a changed-color vector representing a changed color of the current pixel.

Thus the color including both components of the target color and either one of the pair of adjoining non-target colors can be selected as a target of color change operation.

In a preferred embodiment, the step (a) comprises the steps of: specifying a plurality of candidate colors as candidates for the pair of adjoining non-subject colors; and selecting two of the plurality of candidate colors, as the pair of adjoining non-subject colors, whose hue component vectors have the smallest angle which includes a hue component vector of the subject color.

Thus a color range defined by the pair of adjoining non-target colors on the hue ring can be selected as a target of color change operation. This allows the user to easily specify the target range of color change operation.

The step (f) comprises the steps of: successively selecting one of the pair of vector combinations; obtaining the first through third coefficients for the three color vectors included in the selected vector combination; and providing the first through third coefficients for the selected vector combination to be used in the step (g) only if the first and second coefficients are both positive for the selected vector combination.

Thus the target range of color change operation can be determined based on the signs of the first and second coefficients. This desirably simplifies the process of color change operation.

The present invention is further directed to an apparatus of changing a color in a color image into another color. The apparatus comprises: means for specifying first and second colors for defining a color range to be processed by color change operation, and a substitute color, which is to be used as a color component of a changed color after the color change operation; means for obtaining first and second color vectors representing the first and second colors in a color space; means for obtaining a substitute color vector representing the substitute color in the color space; computation means for obtaining a third color vector linearly independent of the first and second color vectors; means for expressing a color of each pixel in the color image by a linear combination of the first through third color vectors, to thereby obtain first through third coefficients for the first through third color vectors; and color changing means for, if the first coefficient for a current pixel is positive, executing the color change operation through combing the substitute color vector, the second color vector, and the third color vector while using the first through third coefficients as weighting factors, respectively, to thereby produce a changed-color vector representing a changed color of the current pixel.

In another aspect of the present invention, the apparatus comprises: means for specifying a subject color and a pair of adjoining non-subject colors for defining a color range to be processed by color change operation, and a substitute color, which is to be used as a color component of a changed color after the color change operation; means for obtaining a first color vector representing the first color in a color space, and a pair of second color vectors representing the pair of adjoining non-subject colors; means for obtaining a substitute color vector representing the substitute color in the color space; computation means for successively selecting one of the pair of second color vectors, and obtaining a third color vector linearly independent of the first color vector and the selected second color vector, to thereby obtain a pair of vector combinations each including the first vector, the selected second vector, and the third vector; coefficient operation means for selecting one of the pair of vector combinations, and expressing a color of each pixel in the color image by a linear combination of three color vectors included in the selected vector combination, to thereby obtain first through third coefficients for the three color vectors; and color changing means for executing the color change operation through combing the substitute color vector, the selected second color vector included in the selected vector combination, and the third color vector while using the first through third coefficients as weighting factors, respectively, to thereby produce a changed-color vector representing a changed color of the current pixel.

These and other objects, features, aspects, and advantages of the present invention will become more apparent from the following detailed description of the preferred embodiments with the accompanying drawings.

BRIEF DESCRIPTION OF THE DRAWINGS

FIG. 11(A) shows a color vector representing a color E prior to the color change operation;

FIG. 11(B) shows another color vector E' after the color change;

FIGS. 17(A) through 17(D) show an example of color change operation using a brush mask.

DESCRIPTION OF THE PREFERRED EMBODIMENT

A. First Embodiment

Figure 1:
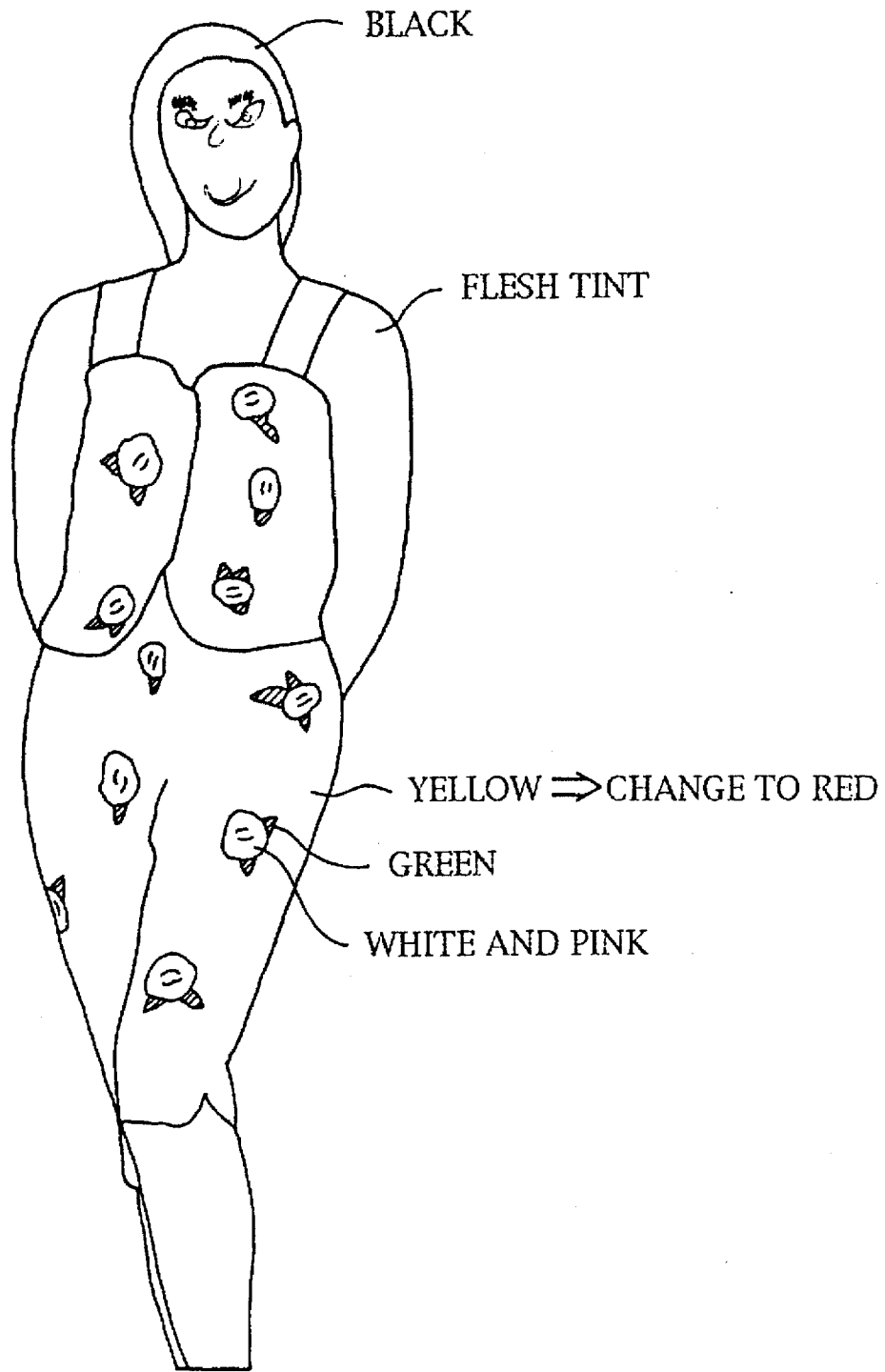
FIG. 1 illustrates an original color image which is a target of color change process in the first embodiment according to the present invention.

FIG. 1 illustrates an original color image which is a target of color change process in a first embodiment according to the present invention. The original color image is a photograph in which a model with black hair puts on yellow cloths with rose patterns. The rose patterns include white and pink petals and green leaves surrounding the petals. The following description will show a color change process of changing yellow, the background color of the cloths, into red.

Figure 2:
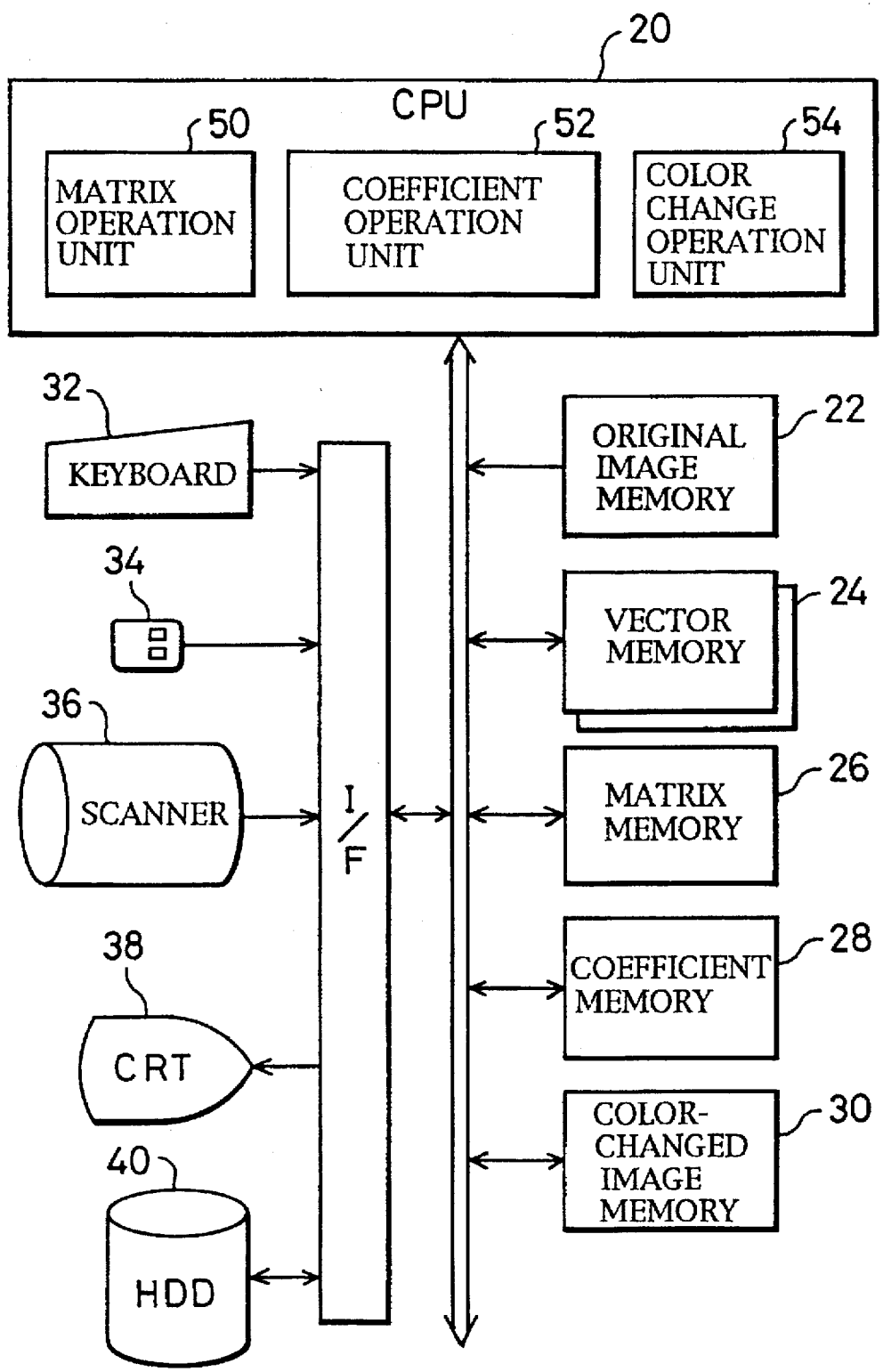
FIG. 2 is a block diagram illustrating an image processing system applied for executing the color change process in the first embodiment of the invention.

FIG. 2 is a block diagram illustrating an image processing system applied for executing a color change process in the first embodiment of the invention. The image processing system is constructed as a computer system including a CPU 20, an original image memory 22 for storing an original color image, a vector memory 24 for storing components of color vectors, a matrix memory 26 for storing a matrix, which will be described later, a coefficient memory 28 for storing coefficients assigned to the color vectors, and a color-changed image memory 30 for storing a processed image after the color change process. The system is further provided with a keyboard 32 and a mouse 34 functioning as input means or specification means, a scanner 36 as image input means, a color CRT 38 as display means, and a hard disk drive 40 as external storage means.

The CPU 20 implements functions of a matrix operation unit 50, a coefficient operation unit 52, and a color change operation unit 54. The CPU 20 executes software programs stored in a RAM (not shown) to implement these functions, which will be described below in detail.

Figure 3:
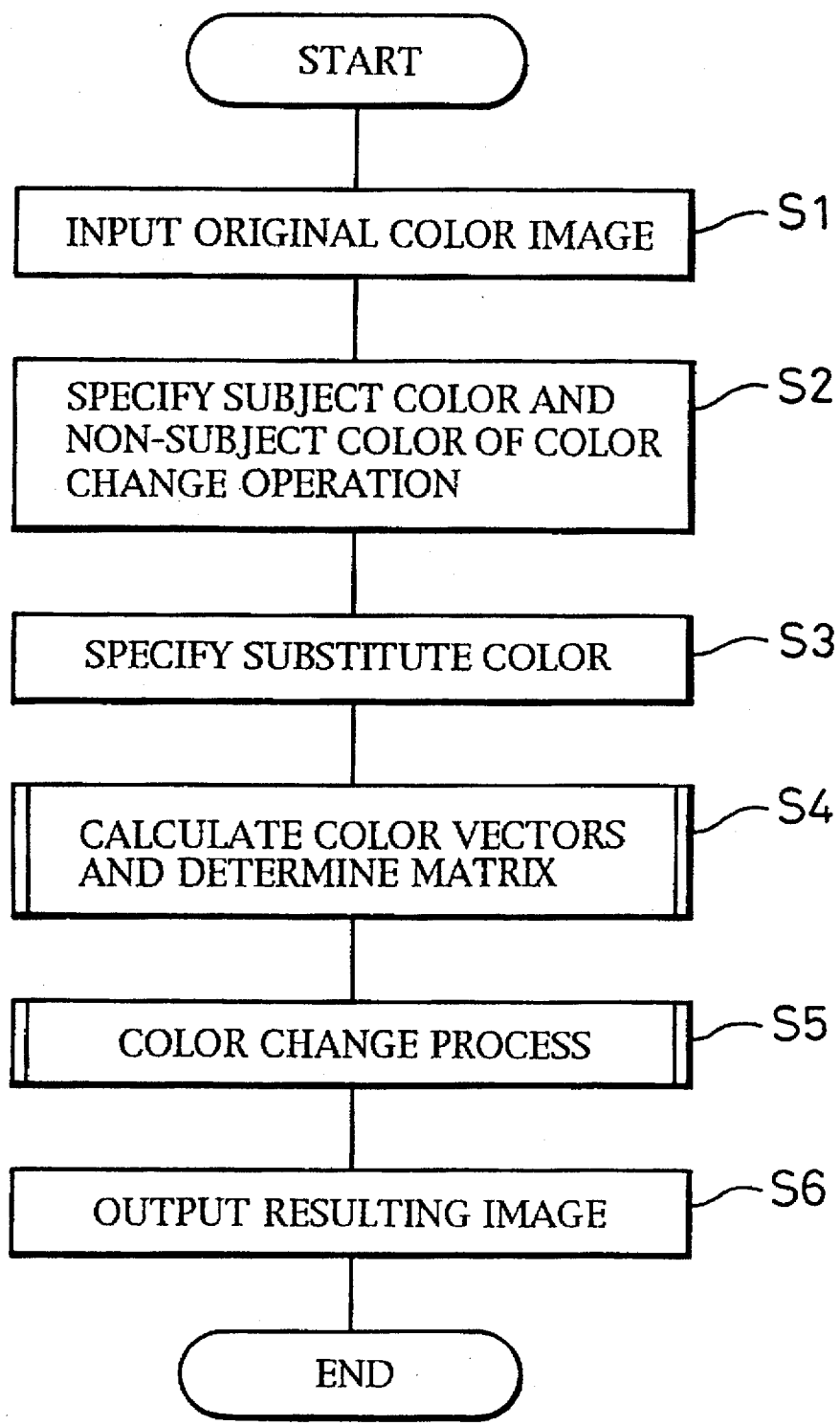
FIG. 3 is a flowchart showing a general routine of the color change process in the first embodiment.

FIG. 3 is a flowchart showing a general routine of color change process in the first embodiment. At step S1, image data representing an original color image are captured by the scanner 36 and stored in the original image memory 22. The original color image is, for example, a color photograph as shown in FIG. 1. The original image memory 22 includes a frame memory, and the image stored in the original image memory 22 is displayed on the color CRT 38.

The user specifies one subject color of the color change process and one non-subject color at step S2, and then specifies one substitute color at step S3. The subject color and the non-subject color define a target color range which is to be processed by the color change process, as will be described later in detail. The substitute color will substitute for the subject color in the color change process. In the example of FIG. 1, yellow, the background color of the clothes, is specified as the subject color and green as the non-subject color while red is specified as the substitute color. The user can specify the colors by indicating one point in the color image displayed on the color CRT 38 with a pointing device, such as the mouse 34. The substitute color may be an arbitrary color not included in the original color image.

The subject color and the non-subject color correspond to the "first color" and the "second color" of the invention, respectively.

A variety of known methods can be applied in specifying the subject, non-subject and substitute colors. In one of such methods, a plurality of points representing close colors are specified, and an average of the close colors is obtained to determine the subject color. The non-subject color and the substitute color can be determined in the same manner. Another possible method utilizes a color picker (sometimes called a color guide), which is generally used for picking up arbitrary colors, to determine the subject color, the non-subject color, and the substitute color.

Figure 4:
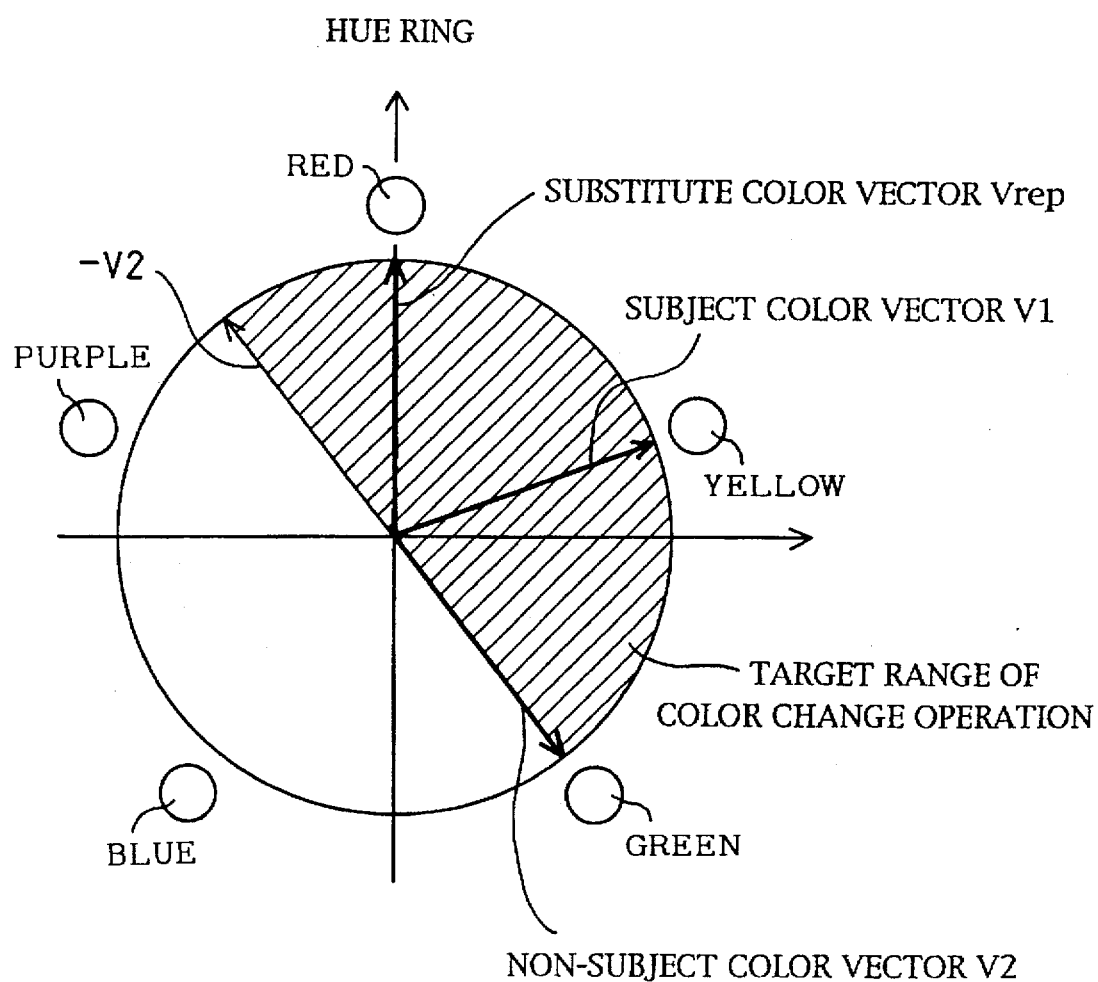
FIG. 4 shows positions of a subject color (yellow) and a non-subject color (green) on the Munsell's hue ring.

FIG. 4 shows the positions of the subject color, the non-subject color, and the subject color on the Munsell's hue ring. In the following description, the subject color and the non-subject color and the substitute will not be referred to by their specific colors, such as yellow, green and red, so as to generally explain the color change process.

At step S4, the matrix operation unit 50 (FIG. 2) calculates color vectors representing the subject color, the non-subject color, and the substitute color to obtain a matrix including those color vectors. The matrix will be explained later in detail.

Figure 5:
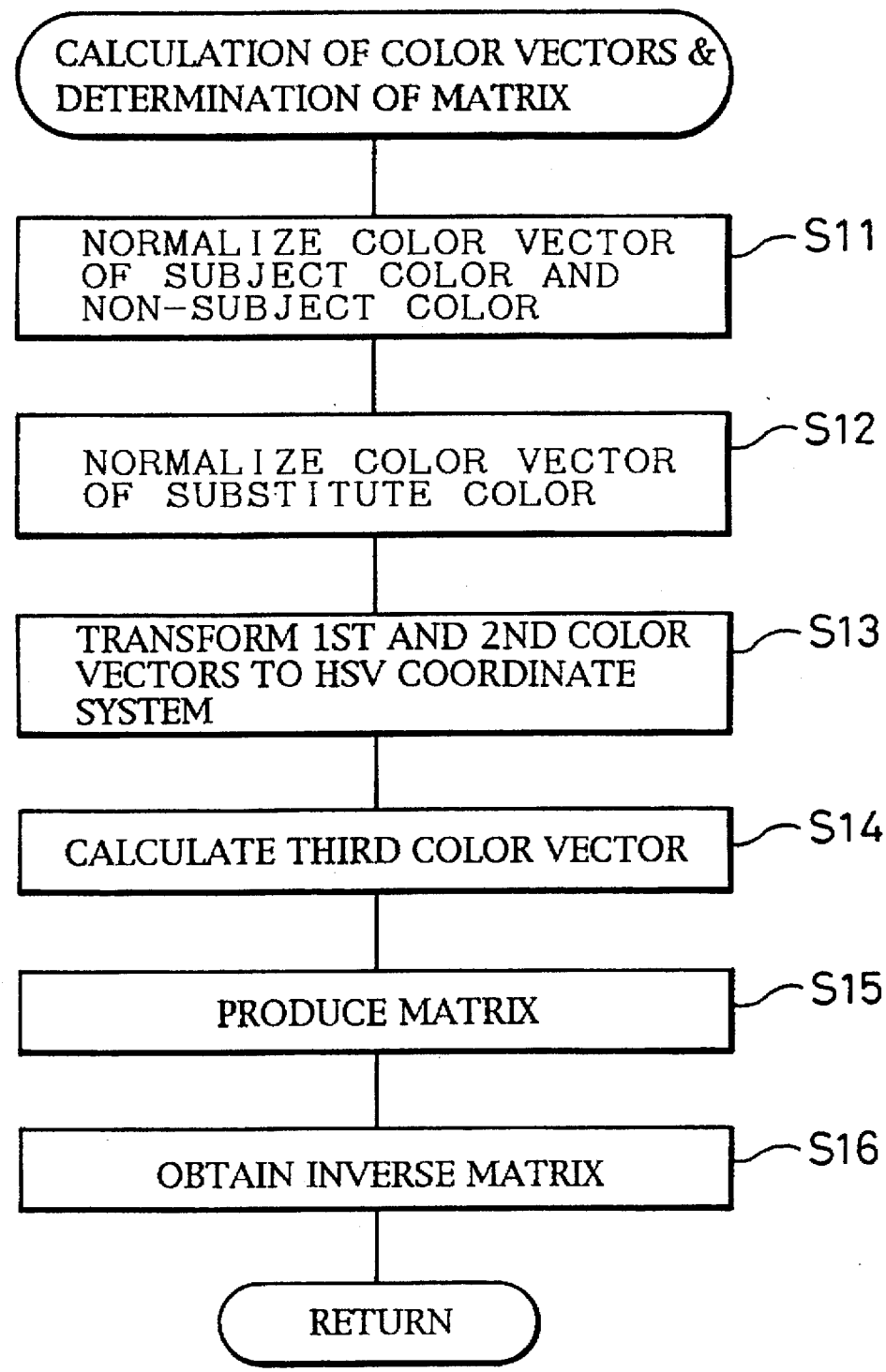
FIG. 5 is a flowchart showing details of the processing executed at step S4 in the flowchart of FIG. 3.
Figure 6:
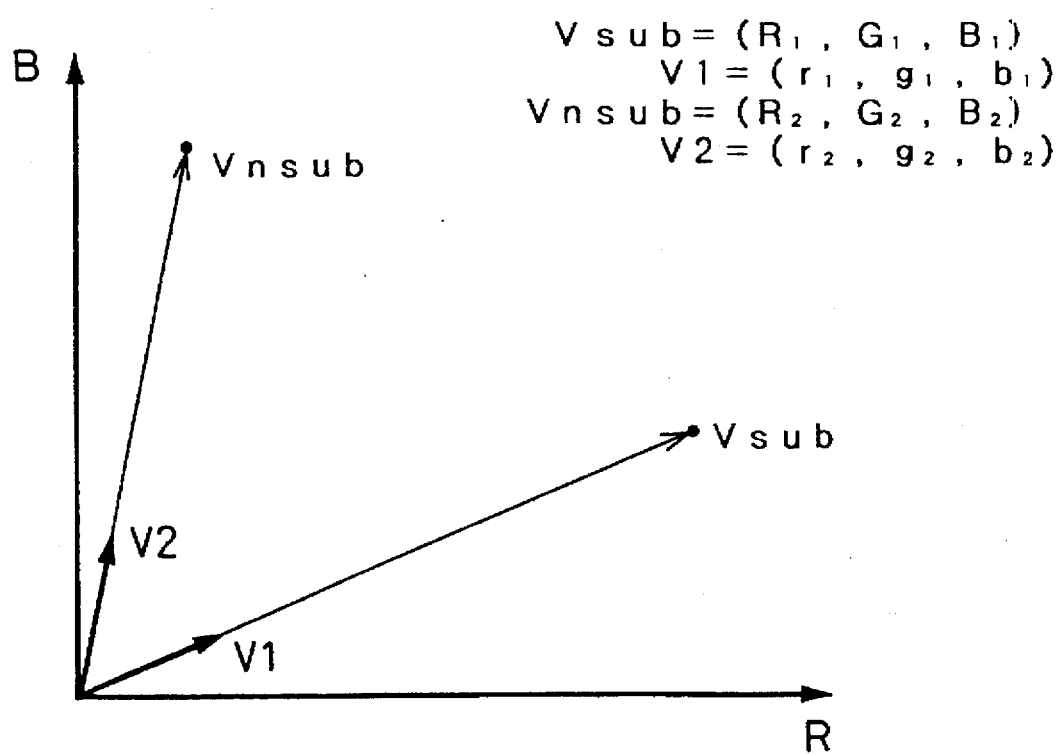
FIG. 6 is a graph showing a first color vector V1 and a second color vector V2.

FIG. 5 is a flowchart showing details of step S4. At step S11, the matrix operation unit 50 normalizes a color vector representing the subject color to determine a first color vector, and normalizes another color vector representing the non-subject color to determine a second color vector. FIG. 6 is a graph showing the first color vector for the subject color and the second color vector for the non-subject color. A color vector representing a subject color $C_{sub}$ is given by Vsub (R1,G1,B1), where (R1,G1,B1) respectively denote R (Red), G (Green), and B (Blue) components of the subject color $C_{sub}$. For convenience of illustration, the G axis of the RGB color space is omitted in FIG. 6. At step S11, the matrix operation unit 50 determines a unit vector V1(r1,g1,b1) of the color vector Vsub and stores the components (r1,g1,b1) of the unit vector in the vector memory 24. The unit vector denotes a vector whose length is equal to one. The matrix operation unit 50 also determines a unit vector V2(r2,g2,b2) of a color vector Vnsub(R2,G2,B2) representing the non-subject color and stores the components (r2,g2,b2) of the unit vector in the vector memory 24 in the same manner.

At step S12, a normalized color vector Vrep for the substitute color is obtained in the same manner as in step S11.

The first color vector V1 and the second color vector V2 thus obtained represent two of three vectors constituting a basis for expressing colors in the RGB space. A unit vector independent of the first and second color vector V1 and V2 is selected as a third color vector V3 for constructing the basis. This means that the third color vector V3 is a unit vector which is not a linear combination of the first and second color vectors V1 and V2. For example, a unit vector VWH representing 'white' can be selected as the third color vector V3. The unit vector VWH representing white has components of $$\left( \frac{1}{\sqrt{3}}, \frac{1}{\sqrt{3}}, \frac{1}{\sqrt{3}} \right).$$

Figure 7:
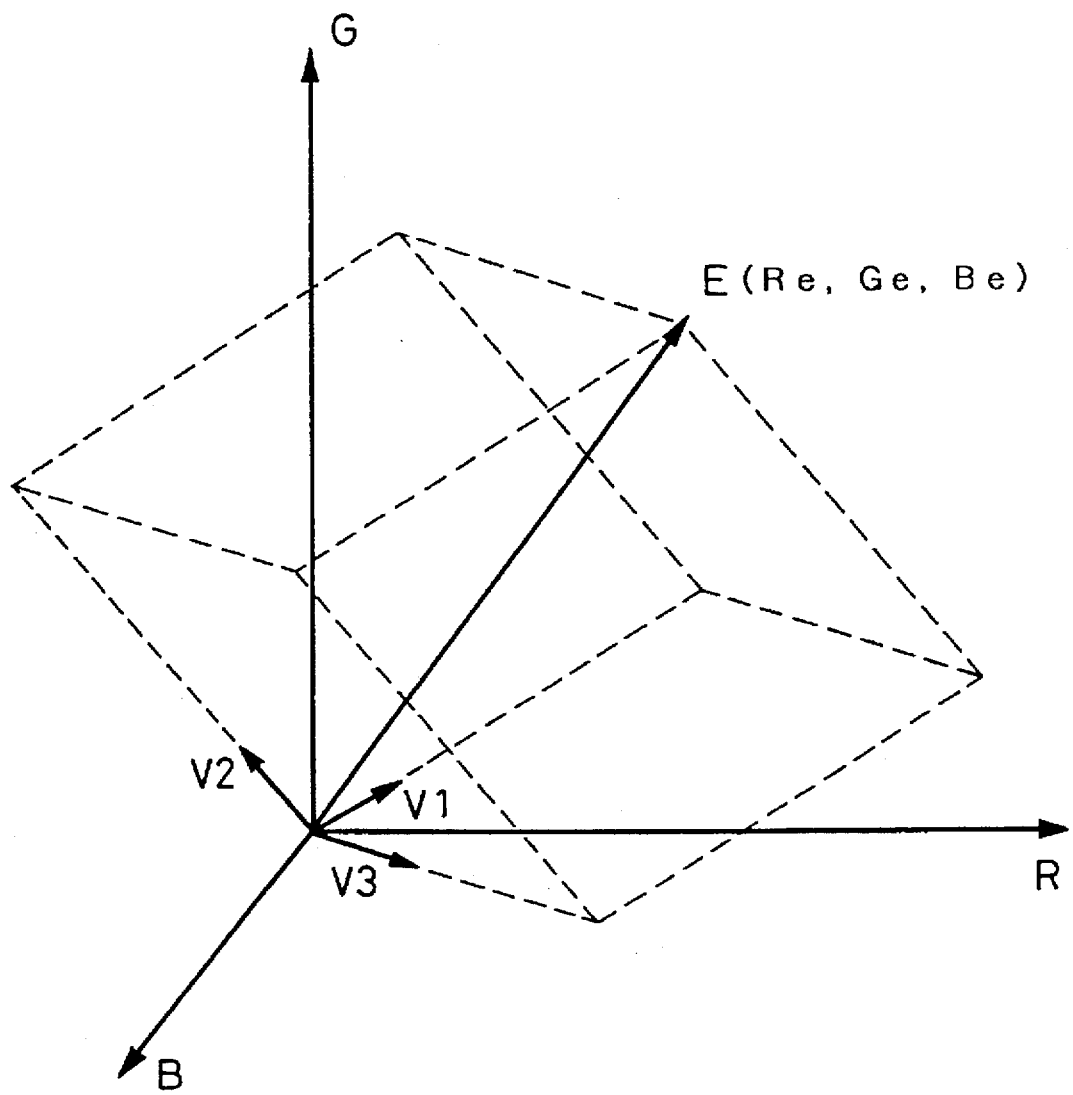
FIG. 7 shows first through third color vectors V1, V2, and V3 in RGB color space.

FIG. 7 shows the first through third color vectors V1, V2, and V3 in the RGB space. In this embodiment, linearly independent three color vectors V1, V2, and V3 define a basis of the color space. Any color E(Re,Ge,Be) in the color space can be expressed as a linear combination of the three color vectors V1, V2, and V3 as given by Equation (1):

$$E = \begin{pmatrix} Re \\ Ge \\ Be \end{pmatrix} \qquad (1)$$

$$= k1\ V1 + k2\ V2 + k3\ V3$$

$$= k1 \begin{pmatrix} r1 \\ g1 \\ b1 \end{pmatrix} + k2 \begin{pmatrix} r2 \\ g2 \\ b2 \end{pmatrix} + k3 \begin{pmatrix} r3 \\ g3 \\ b3 \end{pmatrix}$$

$$= K \cdot M$$

The coefficient matrix K and the basis-vector matrix M are given by Equations (2) and (3):

$$K = (k1, k2, k3) \qquad (2)$$

$$M = \begin{pmatrix} V1 \\ V2 \\ V3 \end{pmatrix} = \begin{pmatrix} r1 & g1 & b1 \\ r2 & g2 & b2 \\ r3 & g3 & b3 \end{pmatrix} \qquad (3)$$

As described later in detail, whether color data of a pixel is to be changed or not is judged based on the coefficient k1 for the first color vector V1 regarding the subject color. If either one of the first and second color vector V1 and V2 coincides with the third color vector V3 representing "white", the three color vectors are not linearly independent, and an arbitrary color can not be expressed by the three color vectors V1 through V3 accordingly. Also, if either the first color vector V1 or the second color vector V2 is sufficiently close to the third color vector V3 representing "white", the coefficient k1 for the first color vector V1 may become excessively large or small. At step S13 in the flowchart of FIG. 5, it is determined whether either one of the first color vector V1 and the second color vector V2 is sufficiently close to the unit white vector VWH $$\left( \frac{1}{\sqrt{3}}, \frac{1}{\sqrt{3}}, \frac{1}{\sqrt{3}} \right).$$

When one of the color vectors V1 and V2 is sufficiently close to the unit white vector VWH, the process proceeds to step S14 at which another vector other than the unit vector VWH is determined as the third color vector V3.

In concrete procedures of step S13, the first color vector v1 and the second color vector V2 are transformed to vectors in an HSV coordinate system, or Hue/Saturation/Brightness system, according to Equations (4a)–(4e):

$$MAX = \max(r, g, b) \quad (4a)$$
$$MIN = \min(r, g, b) \quad (4b)$$
$$H = \arctan\left\{\frac{\sqrt{3}(g-b)}{(r-g)+(r-b)}\right\} \quad (4c)$$
$$V = \frac{MAX + MIN}{2} \quad (4d)$$
$$S = MAX - MIN \quad (4e)$$

In Equations (4a)–(4e), operators 'max()' and 'min()' respectively represent operations of selecting a maximum and a minimum among values in parentheses. Equations (4a)–(4e) give a hue H, a saturation S, and a brightness V for each of the first color vector V1(r1,g1,b1) and the second color vector V2(r2,g2,b2). If r=g=b, the denominator in the parentheses of the right-hand side of Equation (4a), representing the hue H, will be zero. However, it will not cause any problems because the saturation S will also become zero in that case.

Figure 8:
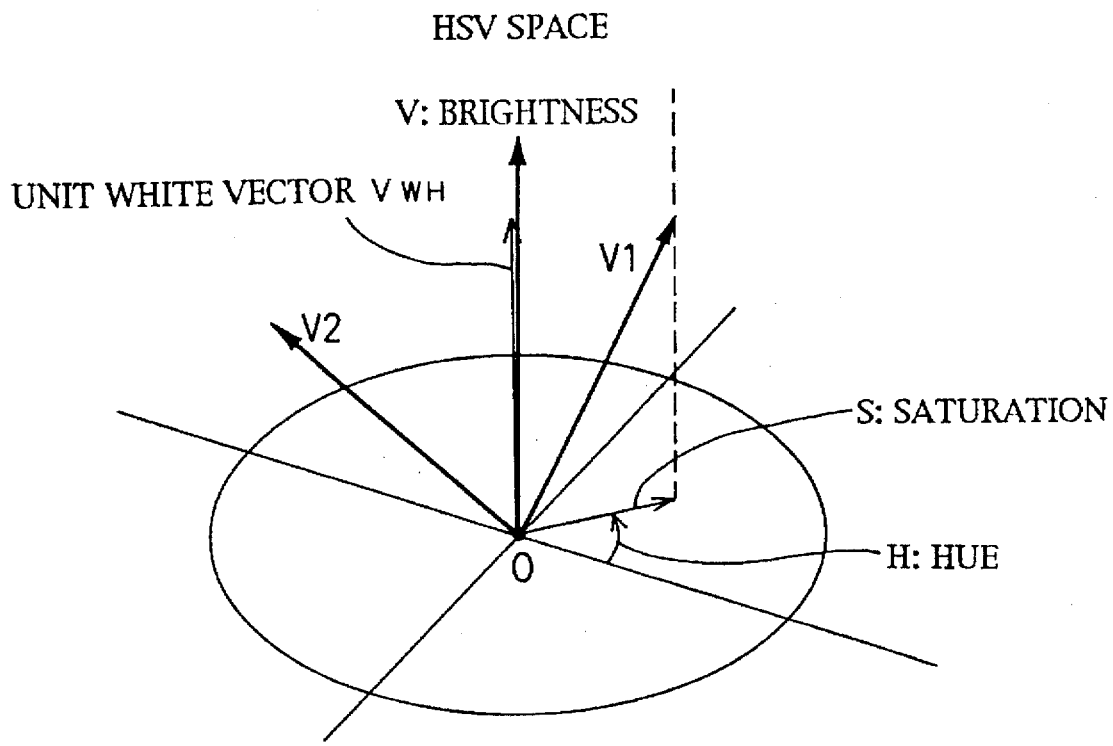
FIG. 8 shows the HSV space.

FIG. 8 shows the HSV space, where the unit vector VWH representing white exists on the coordinate axis of brightness V. This means that the unit white vector VWH does not have either the saturation S or the hue H. The HSV space is a cylindrical polar coordinate system or zrθ coordinate system, where the brightness V corresponds to a vertical coordinate z, the saturation S to a distance r from the z-axis, and the hue H to an angle θ.

A color vector having a small saturation S will be close to the unit white vector $$V_{WH}\left(\frac{1}{\sqrt{3}}, \frac{1}{\sqrt{3}}, \frac{1}{\sqrt{3}}\right).$$

When at least one of the first vector V1 and the second vector V2 has the saturation S not greater than a predetermined level, it is determined that the color vector is sufficiently close to the unit white vector VWH. When each component is given as 8-bit data or expressed as a number in the range of 0 through 255, the predetermined level can be set equal to 10, or 0Ah in hexadecimal notation.

Alternatively, it can be determined that a color vector is sufficiently close to the unit white vector VWH when the ratio S/V of the saturation to the brightness is not greater than a predetermined value.

Figure 9:
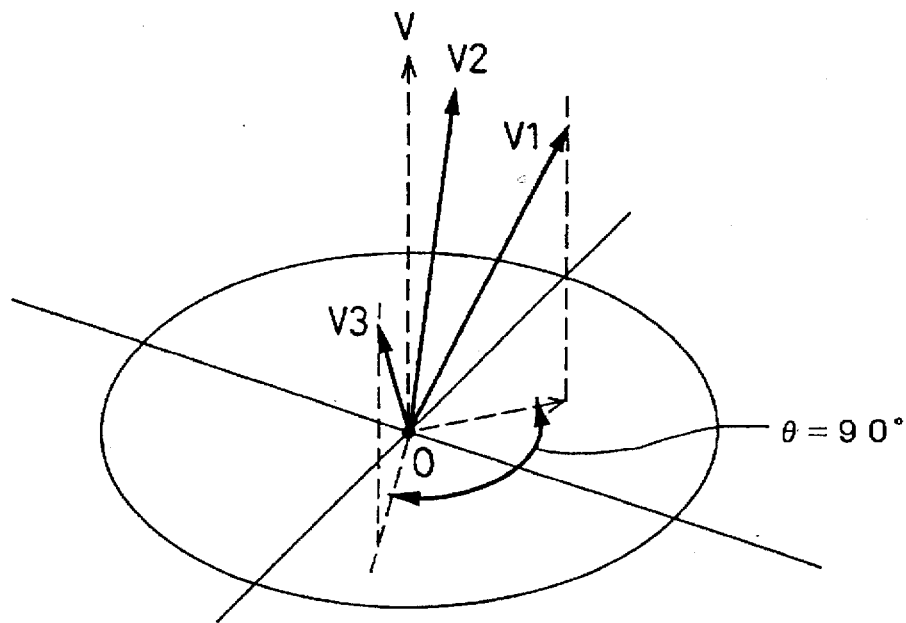
FIG. 9 shows a typical process of specifying a vector other than a unit vector VWH of white color as a third color vector V3.

When at least one of the first color vector V1 and the second color vector V2 is sufficiently close to the unit white vector VWH, another vector other than the unit white vector VWH is set as the third color vector V3 at step S14 of FIG. 5. FIG. 9 shows a process of specifying another vector other than the unit white vector VWH as the third color vector V3. One of the first and second color vectors V1 and V2 which is farther from the unit white vector VWH is selected first. In the example of FIG. 9, the first color vector V1 with the relatively large saturation S is selected. A value of 90 is then subtracted from the hue H of the selected first color vector V1. This is equivalent to a clockwise rotation of the first color vector V1 by 90 degrees in the HSV space. A vector (H-90,S,V) thus obtained is inversely transformed to a vector in the RGB coordinate system, and the R, G, and B components of the transformed vector are normalized to give a unit vector as the new third color vector V3. The third color vector V3 determined through such operations is also shown in FIG. 9. The angle of rotation in the above operation can be set equal to an arbitrary value other than 90 degrees.

The third color vector V3 thus obtained is linearly independent of the first color vector V1 and the second color vector V2, and therefore the three color vectors V1 through V3 will constitute a basis of the color space. In other words, any color in the color space is expressed as a linear combination of the three color vectors V1 through V3 as given by the above Equation (1). Since the third color vector V3 is obtained by rotating the hue component of the first color vector V1 or the second color vector V2, the third color vector V3 represents a real color. Since the three color vectors V1 through V3 respectively represent real colors, and the coefficients k1 through k3 for these color vectors actually give a mixing ratio of the three real colors.

The third color vector V3 can be set to be linearly independent of the first color vector V1 and the second color vector V2 by a variety of methods other than the above process. For example, a cross product V1×V2 of the first and the second color vectors V1 and V2 can be set as the third color vector V3. In this case, however, the cross product V1×V2 may not represent a real color and the coefficients k1 through k3 for the respective color vectors do not accordingly have actual significance. It is thus preferable to determine the third color vector by rotating the hue component of the first color vector or the second color vector as described above.

After the third color vector V3 is determined as above, the matrix operation unit 50 prepares a 3×3 matrix M given by Equation (3) consisting of the components of the three color vectors V1 through V3 at step S15 of FIG. 5. The unit 50 also produces a color change matrix Mrep, which will be described later in detail. The 3×3 matrix M and the color change matrix Mrep are stored in the matrix memory 26.

A set of coefficients K(k1,k2,k3) for the arbitrary color E(Re,Ge,Be) is given by the following Equation (5):

$$K = E \cdot M^{-1} \quad (5)$$

The set of coefficients K(k1,k2,k3) can be determined by multiplying a matrix of the arbitrary color E(Re,Ge,Be) by an inverse of the matrix M. Therefore, at step S16, the matrix operation unit 50 calculates the inverse matrix $M^{-1}$ and stores the inverse matrix $M^{-1}$ in the matrix memory 26.

Figure 10:
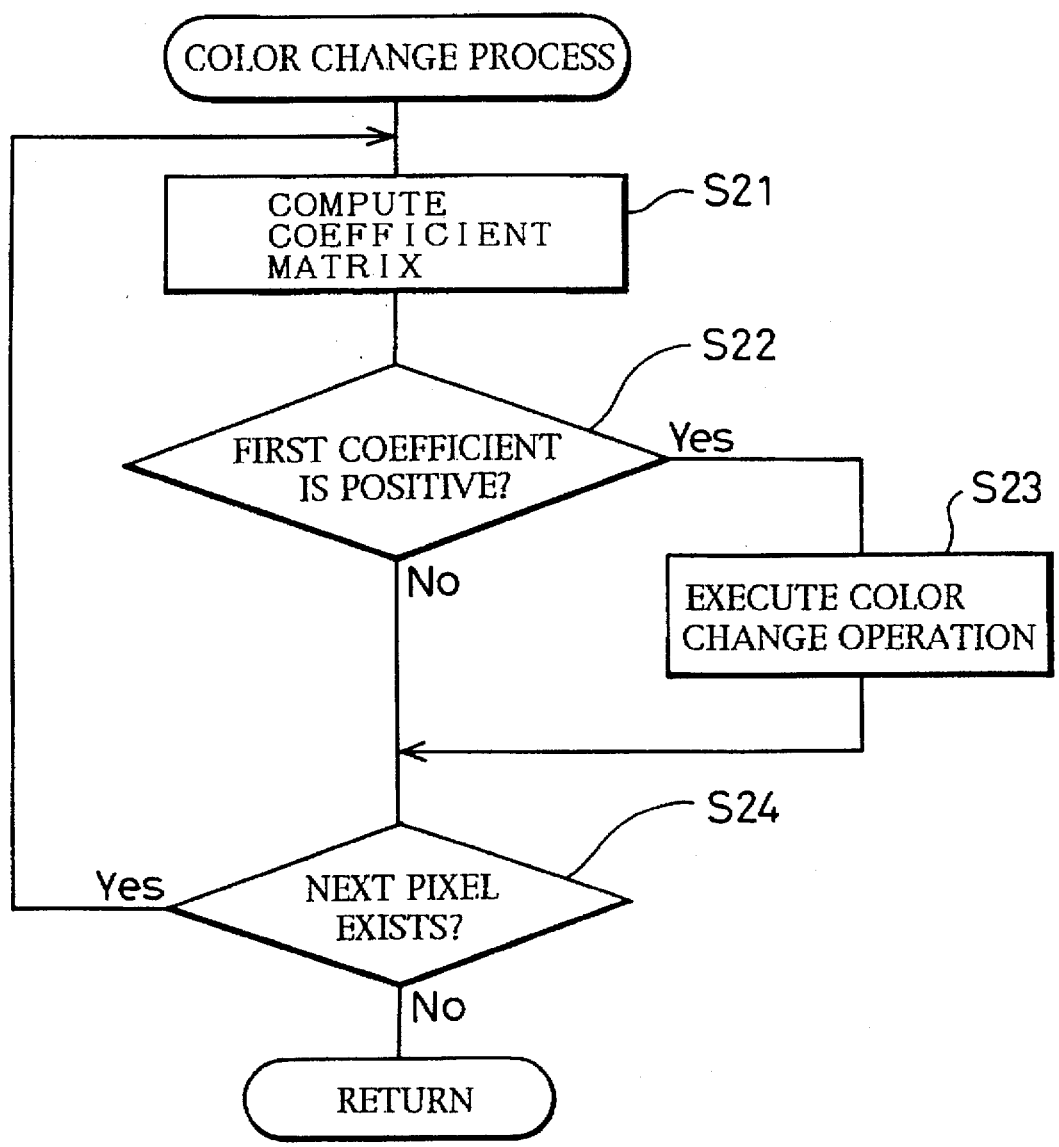
FIG. 10 is a flowchart showing details of the color change process executed at step S5 in the flowchart of FIG. 3.

After the processing at step S4 is completed, the process proceeds to step S5 in the flowchart of FIG. 3 to execute a color change process. FIG. 10 is a flowchart showing details of the color change process. At step S21, the coefficient operation unit 52 reads out a color E(Re,Ge,Be) of each pixel included in the color image stored in the original image memory 22, and substitutes the color E(Re,Ge,Be) into the right-hand side of Equation (5), thereby determining a coefficient matrix K(k1,k2,k3) corresponding to the color E(Re,Ge,Be). The coefficient matrix K(k1,k2,k3) is stored in the coefficient memory 28.

The color change operation unit 54 executes the processing of steps S22 through S24. At step S22, it is determined whether the coefficient k1 of the first color vector V1 is positive. The reason why the branching decision is based on the sign of the first coefficient k1 will be described later. When the first coefficient k1 is positive, the process goes to step S23 which executes color change operation. The color change operation converts the color E(Re,Ge,Be) of the current pixel expressed by Equation (1) into another color E'(Re',Ge',Be') according to the following Equation (6):

$$E = \begin{pmatrix} Re' \\ Ge' \\ Be' \end{pmatrix} \quad (6)$$

$$= k1\,V_{rep} + k2\,V2 + k3\,V3$$

$$= k1 \begin{pmatrix} r_{rep} \\ g_{rep} \\ b_{rep} \end{pmatrix} + k2 \begin{pmatrix} r2 \\ g2 \\ b2 \end{pmatrix} + k3 \begin{pmatrix} r3 \\ g3 \\ b3 \end{pmatrix}$$

$$= K \cdot M_{rep}$$

In Equation (6), the first color vector V1 in the right-hand side of Equation (1) is replaced by a substitute color vector Vrep. FIG. 11 shows color vectors representing a color E prior to the color change operation and another color E' after the color change. The vector representing the color E prior to the color change operation is a composite vector composed of the first through the third color vectors V1, V2, V3 as shown in FIG. 11(A). The vector representing the color E' after the color change is a composite vector composed of the substitute color vector Vrep, the second color vector V2, and the third color vector V3 as shown in FIG. 11(B).

In order to compute the color E' after the color change according to Equation (6), the matrix operation unit 50 pre-computes a color change matrix Mrep expressed by Equation (7) given below, and stores the color change matrix Mrep into the matrix memory 26 at step S15 in the flowchart of FIG. 5:

$$M_{rep} = \begin{pmatrix} V_{rep} \\ V2 \\ V3 \end{pmatrix} = \begin{pmatrix} r_{rep} & g_{rep} & b_{rep} \\ r2 & g2 & b2 \\ r3 & g3 & b3 \end{pmatrix} \quad (7)$$

The color change matrix Mrep is obtained by replacing the first color vector V1 with the substitute color vector Vrep in the matrix M (expressed by Equation (3)), which consists of the first through third color vectors V1, V2, V3.

The color E' after the color change is computed at step S23 by multiplying the coefficient matrix K determined according to Equation (5) by the color change matrix Mrep. Image data representing the color E' after the color change for each pixel are stored into the color-changed image memory 30.

After the process of step S23 is completed or when the first coefficient k1 is not positive at step S22, the process proceeds to step S24 to determine whether there are any more pixels to be processed. If exists, the process returns to step S21 to repeat the processing of steps S21 through S23. If not, the process returns to the main routine shown in FIG. 3.

The reason why the branching decision at step S22 is based on the sign of the first coefficient k1 is as follows. The first coefficient k1 represents the intensity of the first color vector V1, among the three vectors V1–V3, in the color of each pixel. The more the color of the current pixel contains a component of the first color vector V1 (that is, the component of the subject color), the greater the first coefficient k1 becomes. Therefore the execution of the color change operation only if the first coefficient k1 is positive can change only the color of those pixels which contain a component of the subject color.

In FIG. 4, the hatched section represents a target hue range which is subjected to the color change operation. In the target hue range, the coefficient k1 for the first color vector V1 (that is, the subject color vector) is positive. The target hue range of the color change operation is one of the two semicircular hue ranges separated by the non-subject color vector V2 (more precisely, the hue component of the vector V2) and its anti-parallel vector −V2, and includes the subject color vector V1 (more precisely, the hue component of the vector V1).

The execution of the color change operation only for the color of pixels with the positive first coefficient k1 has other advantages. As the value of the first coefficient k1 increases, the color E' after the color change (expressed by Equation (6)) becomes closer to the substitute color. In the image part with a smooth color gradient, this allows the subject color component to be replaced by the substitute color component while maintaining the smooth color gradient.

After completion of step S5 in the flowchart of FIG. 3, the process proceeds to step S6 at which the image obtained through the color change operation is displayed on the color CRT 38.

B. Second Embodiment

Figure 12:
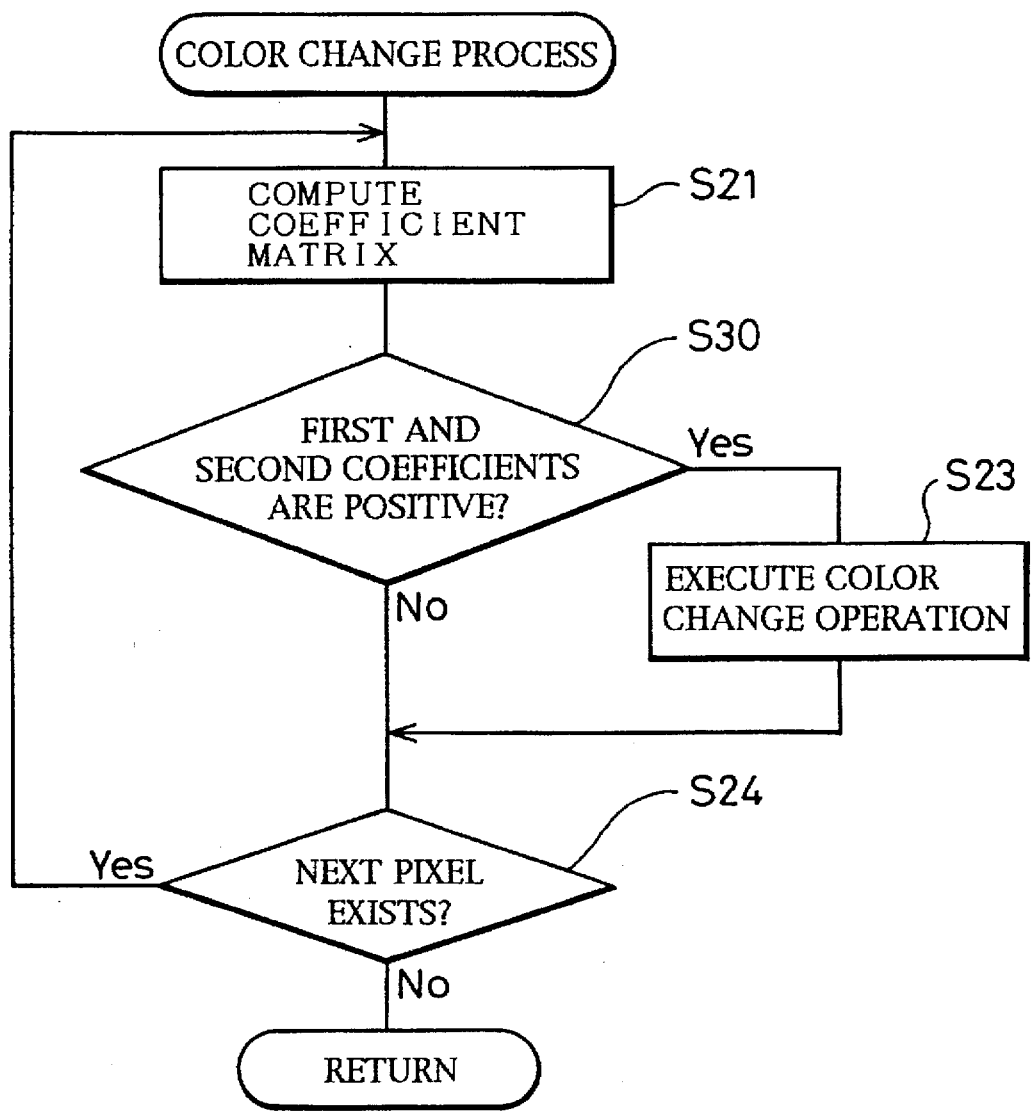
FIG. 12 is a flowchart showing a routine of color change process executed in a second embodiment.
Figure 13:
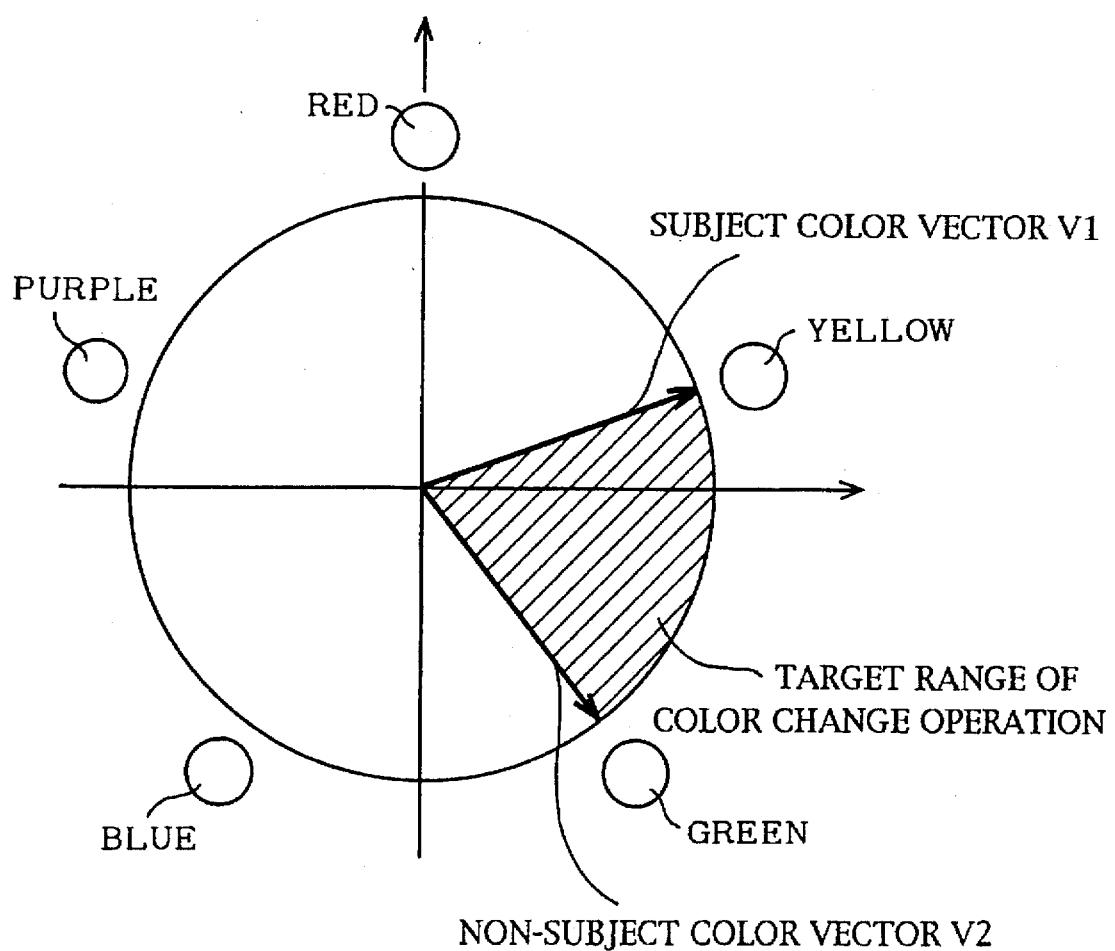
FIG. 13 shows a target hue range of color change operation in the second embodiment.

FIG. 12 is a flowchart showing a routine of color change process executed in a second embodiment of the present invention. The flowchart of FIG. 12 is similar to that of FIG. 10, except that step S22 in FIG. 10 is replaced by step S30. At step S30, only if both the first coefficient k1 and the second coefficient k2 are positive, the process proceeds to step S23 to execute the color change operation. FIG. 13 shows a target hue range which is subjected to the color change operation in the second embodiment. The hatched section in FIG. 13 shows the target hue range of the color change operation. The first coefficient k1 and the second coefficient k2 are positive in the target hue range. The target hue range of the color change operation in the second embodiment is an area defined by the subject color vector (first color vector) V1 and the non-subject color vector (second color vector) V2. In this embodiment, the user can specify the borders of the target hue range of the color change operation by the subject color and the non-subject color.

Accordingly, the user can easily and accurately determine the desired hue range as a target of the color change operation by specifying the subject color and the non-subject color.

C. Third Embodiment

Figure 14:
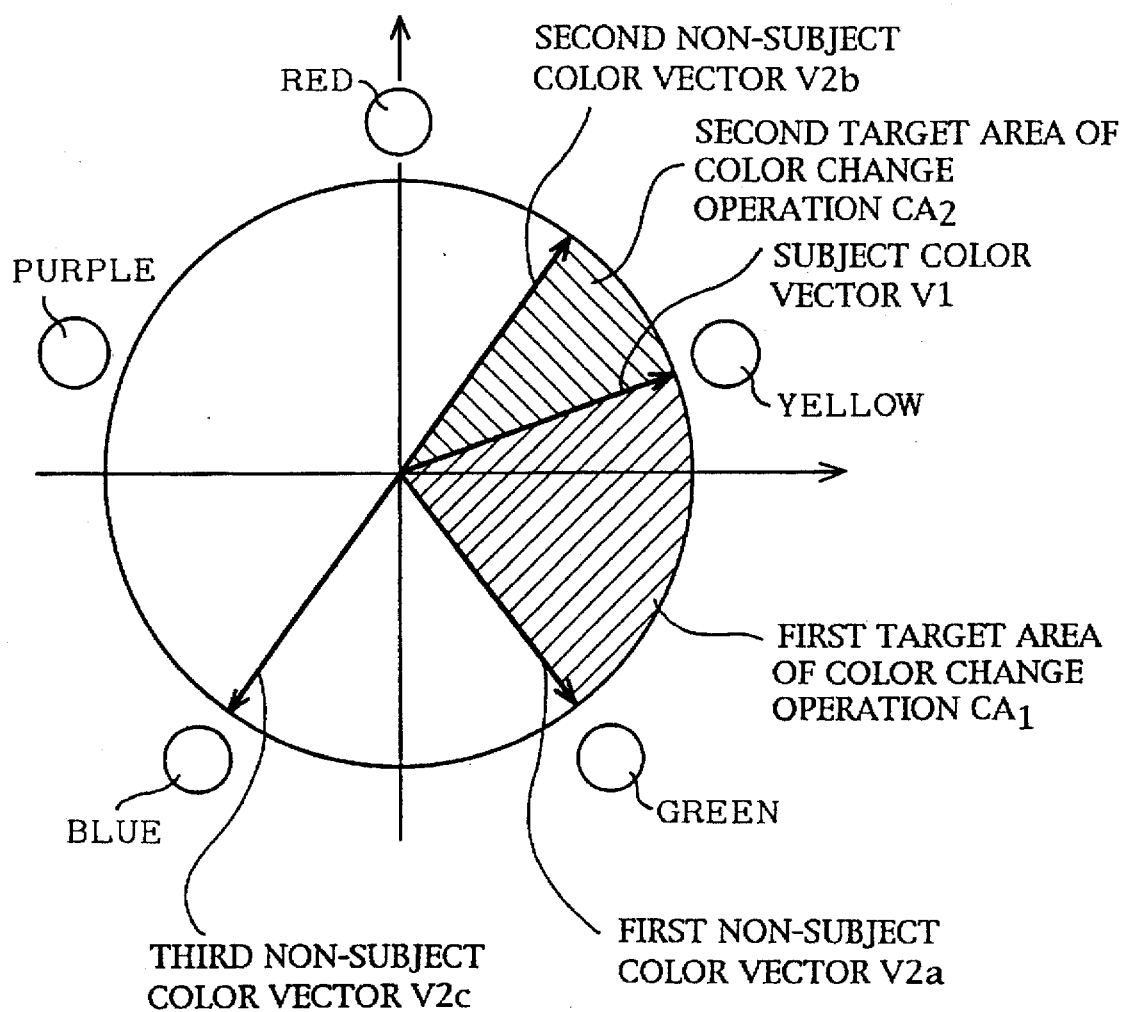
FIG. 14 shows color vectors of a subject color and a plurality of non-subject colors and a target hue range of color change operation in a third embodiment.
Figure 15:
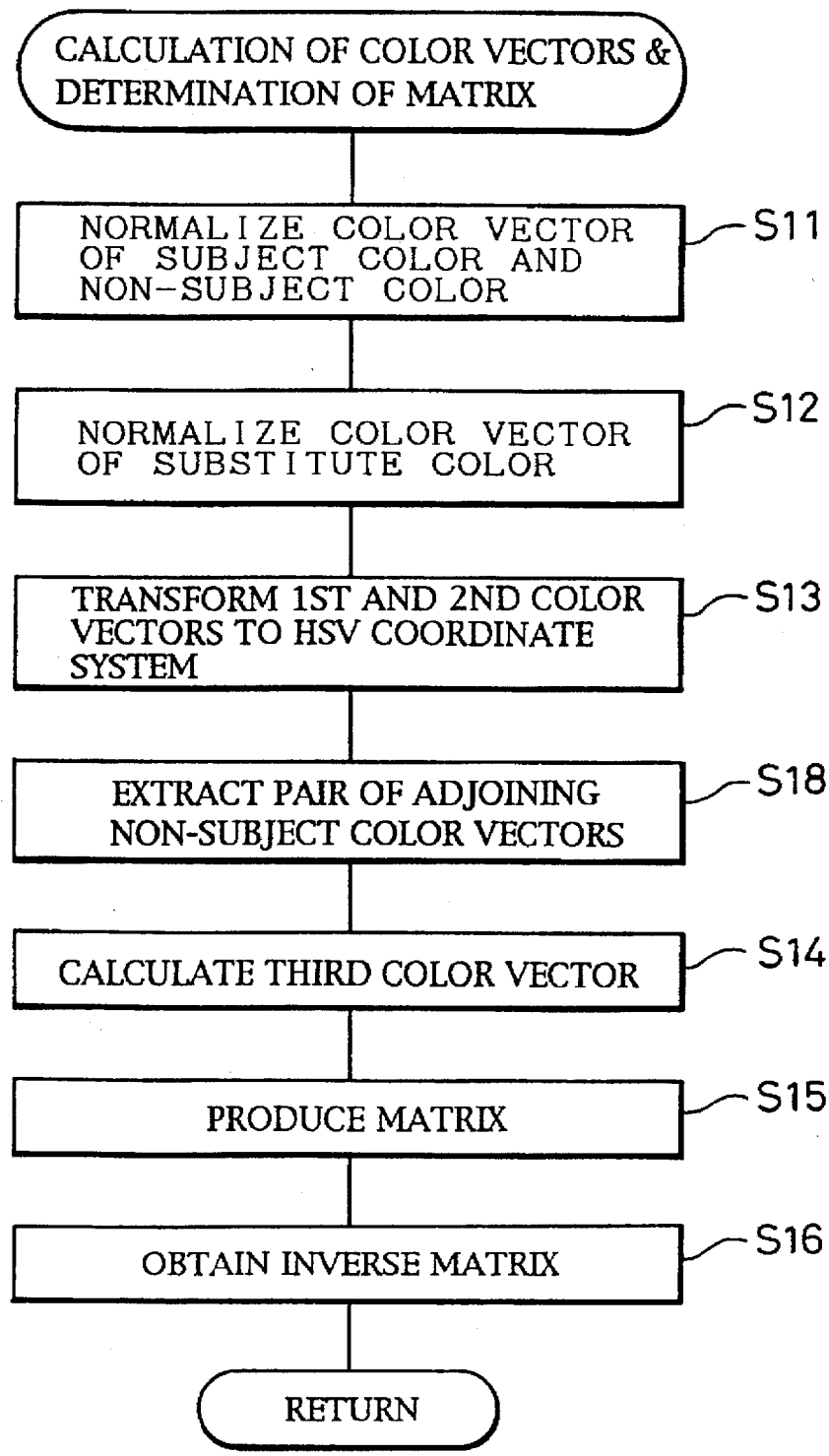
FIG. 15 is a flowchart showing details of the processing executed at step S4 in the third embodiment.

In a third embodiment of the present invention, a plurality of non-subject colors are specified at step S2 in the flowchart of FIG. 3. FIG. 14 shows three non-subject color vectors V2a through V2c corresponding to three non-subject colors on the hue ring. FIG. 15 is a flowchart showing details of step S4 (in the flowchart of FIG. 3) executed in the third embodiment. At step S13, one subject color vector (first color vector) and a plurality of non-subject color vectors (second color vectors) are transformed to vectors in the HSV coordinate system. At subsequent step S18, two non-subject color vectors which have the smallest angle not greater than 180 degrees and which include the subject color vector V1 within the angle are extracted as a "pair of adjoining non-subject color vectors". In the example of FIG. 14, the first non-subject color vector V2a and the second non-subject color vector V2b are chosen as the pair of adjoining non-subject color vectors.

The plurality of non-subject colors specified first in the third embodiment correspond to a plurality of candidate colors in the present invention.

At step S15 in the flowchart of FIG. 15, matrices Ma and Mb expressed by Equations (8a) and (8b) and color change matrices Mrepa and Mrepb expressed by Equations (9a) and (9b) are prepared for the pair of adjoining non-subject color vectors V2a and V2b:

$$M_a = \begin{pmatrix} V1 \\ V2_a \\ V3 \end{pmatrix} = \begin{pmatrix} r1 & g1 & b1 \\ r2_a & g2_a & b2_a \\ r3 & g3 & b3 \end{pmatrix} \quad (8a)$$

$$M_b = \begin{pmatrix} V1 \\ V2_b \\ V3 \end{pmatrix} = \begin{pmatrix} r1 & g1 & b1 \\ r2_b & g2_b & b2_b \\ r3 & g3 & b3 \end{pmatrix} \quad (8b)$$

$$M_{repa} = \begin{pmatrix} V_{rep} \\ V2_a \\ V3 \end{pmatrix} = \begin{pmatrix} r_{rep} & g_{rep} & b_{rep} \\ r2_a & g2_a & b2_a \\ r3 & g3 & b3 \end{pmatrix} \quad (9a)$$

$$M_{repb} = \begin{pmatrix} V_{rep} \\ V2_b \\ V3 \end{pmatrix} = \begin{pmatrix} r_{rep} & g_{rep} & b_{rep} \\ r2_b & g2_b & b2_b \\ r3 & g3 & b3 \end{pmatrix} \quad (9b)$$

The matrices Ma and Mb given by Equations (8a) and (8b) are hereinafter referred to as "color coordinate matrices". The process proceeds to step S16 at which inverses of the color coordinate matrices Ma and Mb are prepared respectively. The two color coordinate matrices Ma and Mb correspond to "two sets of vector combinations" in the present invention.

If the second non-subject color vector V2b shown in FIG. 14 is not specified and if only the first non-subject color vector V2a and the third non-subject color vector V2c are specified for non-subject colors, there are no two non-subject color vectors which have the smallest angle of not greater than 180 degrees and which include the subject color vector V1 within the angle. In such case, only one non-subject color vector V2a which is closest to the subject color vector V1 is selected. If a pair of adjoining non-subject color vectors were selected in this case, the target hue range of the color change operation would be too wide, as described later in detail. Accordingly, in this case, the matrix Ma including the selected non-subject color vector V2a and its inverse matrix are prepared at steps S15 and S16.

Figure 16:
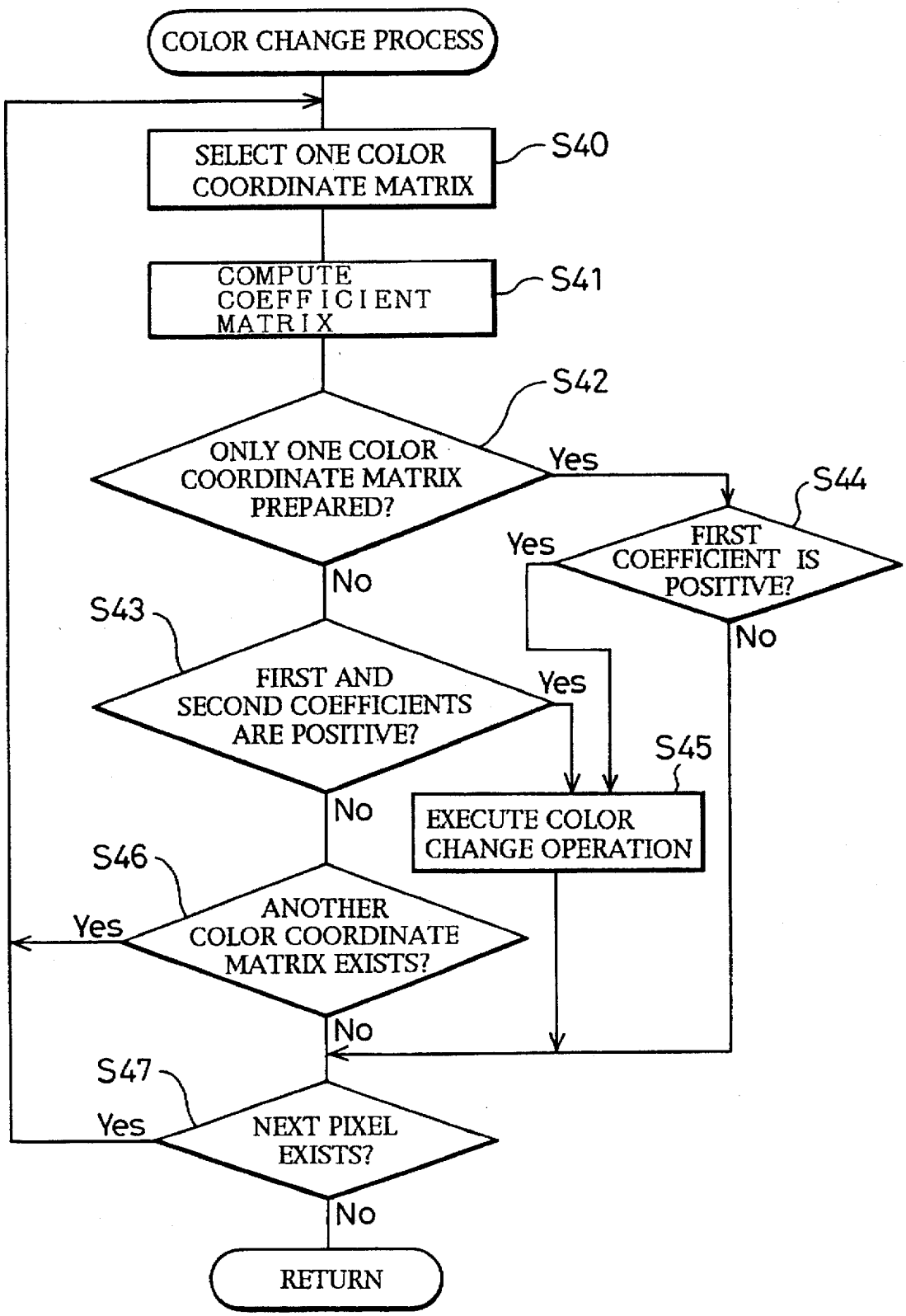
FIG. 16 is a flowchart showing a routine of color change process executed in the third embodiment.

FIG. 16 is a flowchart showing a routine of the color change process executed in the third embodiment. At step S40, any one of the color coordinate matrices prepared at step S15 is selected. The process then goes to step S41 at which an inverse of the selected color coordinate matrix is computed, and a coefficient matrix for one target pixel is calculated from the inverse matrix according to Equations (10a)–(10b):

$$K_a = (k1_a, k2_a, k3_a) = E \cdot M_a^{-1} \quad (10a)$$

$$K_b = (k1_b, k2_b, k3_b) = E \cdot M_b^{-1} \quad (10b)$$

When the first color coordinate matrix Ma is selected at step S40, for example, a first coefficient matrix ka is calculated according to Equation (10a) at step S41.

At step S42, it is determined whether only one color coordinate matrix or two color coordinate matrices are prepared at step S15 in the flowchart of FIG. 15. When the pair of adjoining non-subject color vectors V2a and V2b are extracted as in the example of FIG. 14, it is determined at step S42 that two color coordinate matrices Ma and Mb have been prepared at step S15 and the process proceeds to step S43.

At step S43, only if both the first and the second coefficients (for example, k1a and k2a) included in the coefficient matrix (for example, Ka) computed at step S41 are positive, the process proceeds to step S45 to execute the color change operation. At step S45, a color E' after the color change (for example, Ea') is calculated from the color change matrix (for example, Mrepa) corresponding to the selected color coordinate matrix (for example, Ma), according to Equation (11a) or (11b):

$$E'_a = K_a \cdot M_{repa} \quad (11a)$$

$$E'_b = K_b \cdot M_{repb} \quad (11b)$$

If the color coordinate matrix Ma corresponding to the first non-subject color vector V2a is selected at step S40, the target hue range of the color change operation is a first target area CA1 shown in FIG. 14. The first target area CA1 is defined by the first non-subject color vector V2a and the subject color vector V1.

At step S43 in the flowchart of FIG. 16, if at least one of the first and second coefficients included in the coefficient matrix is not positive, the process proceeds to step S46, at which it is determined whether there remains another color coordinate matrix to be processed. If the answer is positive at step S46, the process returns to step S40 to select a next color coordinate matrix (for example, the second color coordinate matrix Mb) and repeats the processing of steps S41 through S46. If the color coordinate matrix Mb corresponding to the second non-subject color vector V2b is selected at step S40, the target hue range of the color change operation is a second target area CA2 shown in FIG. 14. The second target area CA2 is defined by the second non-subject color vector V2b and the subject color vector V1. In the flow of FIG. 16, the hue range defined by the two non-subject color vectors V2a and V2b (that is, the pair of adjoining non-subject color vectors) shown in FIG. 14 represents the target color range which is subjected to the color change operation. The user can thus specify the borders of the target hue range of the color change operation by the two non-subject colors V2a and V2b. In the third embodiment, either one of the first color coordinate matrix Ma or the second color coordinate matrix Mb is selected according to the signs of the first and second coefficients included in the coefficient matrix, which is successively computed for the selected color coordinate matrix. This simplifies the process of the color change operation.

At step S47, it is determined whether there are any more target pixels to be processed by the color change operation. If any non-processed target pixel exists, the process returns to step S40 to repeat the processing of steps S40 through S46. If there are no more pixels at step S47, the process returns to the main routine.

When there are no two non-subject color vectors which have the smallest angle of not greater than 180 degrees and which include the subject color vector V1 within the angle, extraction of a pair of adjoining non-subject color vectors at step S18 in the flowchart of FIG. 15 would cause the target hue range to have an angle not less than 180 degrees. This would make the target color range undesirably wide. In such case, only one non-subject color vector which is closest to the subject color vector is selected at step S18 to narrow the target hue range of the color change operation.

If only one non-subject color vector is selected at step S18 in the flowchart of FIG. 18, only one color coordinate matrix is prepared at step S15, and therefore the process proceeds from step S42 to step S44 in the flowchart of FIG. 16. At step S44, it is determined whether to execute the color change operation on the basis of the sign of the first coefficient k1 at step S45. This flow is identical with that of the first embodiment. Alternatively, as is the case in the second embodiment, the color change operation can be executed only if both the first and second coefficients included in the coefficient matrix are positive.

As described above, since the target hue range of the color change operation is an area defined by the two non-subject colors in the third embodiment, the user can thus easily and accurately set the desired hue range as a target of the color change operation.

It is clearly understood that the above embodiments are only illustrative and not restrictive in any sense. There may be many modifications, alternations, and changes without departing from the scope or spirit of essential characteristics of the invention. Some examples of modification are given below.

(1) FIG. 17 shows an example of color change operation using a brush mask. For the convenience of explanation, it is assumed that an original color image includes a subject color area and a non-subject color area as shown in FIG. 17(A). The brush mask represents a target area of image processing and the position thereof is specified with a pointing device, such as a mouse, by a user. The color change operation is to be executed in the brush mask area thus specified. Although the brush mask area is a circular region in the example of FIG. 17(B), an area of any arbitrary shape may be used as the brush mask area.

By using a brush mask, execution of the color change operation can be limited to the color of pixels which are included in both of the subject color area and the brush mask area as shown in FIGS. 17(C) and 17(D). In an actual procedure, the user instruct to execute the color change operation while moving the brush mask on the original color image with a pointing device. This allows the color change operation to be selectively executed only for the image part specified by the user.

(2) In the third embodiment, either the first color coordinate matrix Ma or the second color coordinate matrix Mb is selected according to the signs of the first and second coefficients included in the coefficient matrix. The selection may, however, be implemented by another method.

One applicable method comprises the steps of: projecting the subject color vector V1, the pair of adjoining non-subject color vectors V2a and V2b, and a vector VP of a target pixel color onto the hue ring plane; computing cross products of the target pixel-color vector VP and the other color vectors; and selecting the color coordinate matrix based on the signs of the cross-product vectors. In a concrete procedure, it is determined whether the vector VP of the target pixel color is within a first area defined by the subject color vector V1 and the adjoining non-subject color vector V2a, based on the sign of the cross product of the subject color vector V1 and the target pixel vector VP as well as the sign of the cross product of the target pixel vector VP and the adjoining non-subject color vector V2a. If the vector VP of the target pixel color is determined to be within the first area, the first color coordinate matrix Ma is selected. In a similar manner, it is determined whether the vector VP of the target pixel color is within a second area defined by the subject color vector V1 and the adjoining non-subject color vector V2b, based on the sign of a cross product of the subject color vector V1 and the target pixel vector VP as well as the sign of a cross product of the target pixel vector VP and the adjoining non-subject color vector V2b. If the vector VP of the target pixel color is determined to be within the second area, the second color coordinate matrix Mb is selected.

Another applicable method comprises the steps of: projecting the subject color vector V1, the pair of adjoining non-subject color vectors V2a and V2b, and the vector VP of a target pixel color onto the hue ring plane; computing hue angles of two specified vectors; and selecting a color coordinate matrix based on the hue angles. For example, a hue angle $\theta 1$ between the vectors V2a and V1 is computed, and so are another hue angle $\theta P$ between the vectors V2a and VP, and still another hue angel $\theta 2$ between the vectors V2a and V2. If $\theta P \leq \theta 1 \leq \theta 2$ holds, the first color coordinate matrix Ma will be selected. If $\theta 1 \leq \theta P \leq \theta 2$ holds, on the other hand, the second color coordinate matrix Mb will be selected. The color E' after the color change (that is, Ea' or Eb') is determined by the color change matrix $M_{repa}$ or $M_{repb}$ corresponding to the selected color coordinate matrix Ma or Mb.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of changing a color in a color image into another color, said method comprising the steps of:

(a) specifying first and second colors for defining a color range to be processed by color change operation;

(b) specifying a substitute color, which is to be used as a color component of a changed color after said color change operation;

(c) obtaining first and second color vectors representing said first and second colors in a color space;

(d) obtaining a substitute color vector representing said substitute color in said color space;

(e) obtaining a third color vector linearly independent of the first and second color vectors;

(f) expressing a color of each pixel in said color image by a linear combination of said first through third color vectors, to thereby obtain first through third coefficients for said first through third color vectors; and (g) if said first coefficient for a current pixel is positive, executing the color change operation through combing said substitute color vector, said second color vector, and said third color vector while using said first through third coefficients as weighting factors, respectively, to thereby produce a changed-color vector representing a changed color of the current pixel.

2. A method in accordance with claim 1, wherein said step (g) comprises the step of executing the color change operation only if said first and second coefficients are both positive for said current pixel.

3. A method in accordance with claim 1, wherein said third color vector represents white.

4. A method in accordance with claim 1, wherein said step (e) comprises the steps of:

transforming said first and second color vectors to fourth and fifth color vectors in a hue/saturation/brightness space; and selecting a vector representing white in said color space as said third color vector when saturation components of said fourth and fifth color vectors are more than a predetermined value; and when a saturation component of at least one of said fourth and fifth color vectors is less than said predetermined value, rotating a hue component of one said fourth and fifth color vectors, whose saturation component is the greater, by a predetermined angle in said hue/saturation/brightness space to generate a sixth color vector and transforming said sixth color vector into said color space to generate said third color vector.

5. A method in accordance with claim 1, wherein said first through third color vectors and said substitute vector are unit vectors.

6. A method of changing a color in a color image into another color, said method comprising the steps of:
   (a) specifying a subject color and a pair of adjoining non-subject colors for defining a color range to be processed by color change operation;
   (b) specifying a substitute color, which is to be used as a color component of a changed color after said color change operation;
   (c) obtaining a first color vector representing said first color in a color space, and a pair of second color vectors representing said pair of adjoining non-subject colors;
   (d) obtaining a substitute color vector representing said substitute color in said color space;
   (e) successively selecting one of said pair of second color vectors, and obtaining a third color vector linearly independent of the first color vector and said selected second color vector, to thereby obtain a pair of vector combinations each including said first vector, said selected second vector, and said third vector;
   (f) selecting one of said pair of vector combinations, and expressing a color of each pixel in said color image by a linear combination of three color vectors included in said selected vector combination, to thereby obtain first through third coefficients for said three color vectors; and
   (g) executing the color change operation through combing said substitute color vector, said selected second color vector included in the selected vector combination, and said third color vector while using said first through third coefficients as weighting factors, respectively, to thereby produce a changed-color vector representing a changed color of the current pixel.

7. A method in accordance with claim 6, wherein said step (a) comprises the steps of:
   specifying a plurality of candidate colors as candidates for said pair of adjoining non-subject colors; and
   selecting two of said plurality of candidate colors, as said pair of adjoining non-subject colors, whose hue component vectors have the smallest angle which includes a hue component vector of said subject color.

8. A method in accordance with claim 6, wherein said step (f) comprises the steps of:
   successively selecting one of said pair of vector combinations;
   obtaining said first through third coefficients for said three color vectors included in the selected vector combination; and
   providing said first through third coefficients for said selected vector combination to be used in said step (g) only if said first and second coefficients are both positive for said selected vector combination.

9. An apparatus of changing a color in a color image into another color, said apparatus comprising:
   means for specifying first and second colors for defining a color range to be processed by color change operation, and a substitute color, which is to be used as a color component of a changed color after said color change operation;
   means for obtaining first and second color vectors representing said first and second colors in a color space;
   means for obtaining a substitute color vector representing said substitute color in said color space;
   computation means for obtaining a third color vector linearly independent of the first and second color vectors;
   means for expressing a color of each pixel in said color image by a linear combination of said first through third color vectors, to thereby obtain first through third coefficients for said first through third color vectors; and
   color changing means for, if said first coefficient for a current pixel is positive, executing the color change operation through combing said substitute color vector, said second color vector, and said third color vector while using said first through third coefficients as weighting factors, respectively, to thereby produce a changed-color vector representing a changed color of the current pixel.

10. An apparatus in accordance with claim 9, wherein said color changing means comprises means for executing the color change operation only if said first and second coefficients are both positive for said current pixel.

11. An apparatus in accordance with claim 9, wherein said third color vector represents white.

12. An apparatus in accordance with claim 9, wherein said computation means comprises:
   means for transforming said first and second color vectors to fourth and fifth color vectors in a hue/saturation/brightness space; and
   means for selecting a vector representing white in said color space as said third color vector when saturation components of said fourth and fifth color vectors are more than a predetermined value; and when a saturation component of at least one of said fourth and fifth color vectors is less than said predetermined value, rotating a hue component of one said fourth and fifth color vectors, whose saturation component is the greater, by a predetermined angle in said hue/saturation/brightness space to generate a sixth color vector and transforming said sixth color vector into said color space to generate said third color vector.

13. An apparatus in accordance with claim 9, wherein said first through third color vectors and said substitute vector are unit vectors.

14. An apparatus of changing a color in a color image into another color, said apparatus comprising:
   means for specifying a subject color and a pair of adjoining non-subject colors for defining a color range to be processed by color change operation, and a substitute color, which is to be used as a color component of a changed color after said color change operation;
   means for obtaining a first color vector representing said first color in a color space, and a pair of second color vectors representing said pair of adjoining non-subject colors;
   means for obtaining a substitute color vector representing said substitute color in said color space;
   computation means for successively selecting one of said pair of second color vectors, and obtaining a third color vector linearly independent of the first color vector and said selected second color vector, to thereby obtain a pair of vector combinations each including said first vector, said selected second vector, and said third vector;
   coefficient operation means for selecting one of said pair of vector combinations, and expressing a color of each pixel in said color image by a linear combination of three color vectors included in said selected vector combination, to thereby obtain first through third coefficients for said three color vectors; and color changing means for executing the color change operation through combing said substitute color vector, said selected second color vector included in the selected vector combination, and said third color vector while using said first through third coefficients as weighting factors, respectively, to thereby produce a changed-color vector representing a changed color of the current pixel.

15. An apparatus in accordance with claim 14, wherein said specifying means comprises:

means for specifying a plurality of candidate colors as candidates for said pair of adjoining non-subject colors; and means for selecting two of said plurality of candidate colors, as said pair of adjoining non-subject colors, whose hue component vectors have the smallest angle which includes a hue component vector of said subject color.

16. An apparatus in accordance with claim 14, wherein said coefficient operation means comprises:

means for successively selecting one of said pair of vector combinations;

means for obtaining said first through third coefficients for said three color vectors included in the selected vector combination; and means for providing said first through third coefficients for said selected vector combination to said color changing means only if said first and second coefficients are both positive for said selected vector combination.

* * * * *